United States Patent [19]

Vaughan et al.

[11] Patent Number: 4,871,886
[45] Date of Patent: Oct. 3, 1989

[54] ELECTRONIC KEY AND RECEPTACLE THEREFOR

[75] Inventors: John E. Vaughan; David R. Smale; Bernard Patry, all of Felixstowe; John C. Heaton, Ipswich, all of England

[73] Assignee: Schlumberger Industries Limited, Farnborough, England

[21] Appl. No.: 61,372

[22] Filed: Jun. 15, 1987

[30] Foreign Application Priority Data

Jun. 16, 1986 [GB] United Kingdom ............... 8614621
Oct. 27, 1986 [GB] United Kingdom ............... 8625675

[51] Int. Cl.$^4$ ............................................. H01R 31/08
[52] U.S. Cl. .................................................. 200/43.05
[58] Field of Search ............... 200/42.02, 43.05, 43.06, 200/43.04, 46; 70/455, 277, 278, DIG. 46; 180/287; 307/10 AT

[56] References Cited

U.S. PATENT DOCUMENTS

| | | | |
|---|---|---|---|
| 3,367,156 | 2/1968 | Johnstone | 70/455 X |
| 3,644,745 | 2/1972 | Bell | 200/43.05 X |
| 4,127,018 | 11/1978 | Brand | 70/277 X |
| 4,295,350 | 10/1981 | Grinage | 70/454 |
| 4,697,171 | 9/1987 | Suh | 180/287 X |

FOREIGN PATENT DOCUMENTS

| | | |
|---|---|---|
| 0043145 | 1/1982 | European Pat. Off. . |
| 2577971 | 8/1986 | France . |
| WO83/00976 | 3/1983 | PCT Int'l Appl. . |
| WO85/01812 | 11/1984 | PCT Int'l Appl. .................. 194/2 |
| 894349 | 4/1962 | United Kingdom . |
| 1268647 | 3/1972 | United Kingdom . |
| 1325247 | 8/1973 | United Kingdom . |
| 1374504 | 11/1974 | United Kingdom . |
| 2022677 | 12/1979 | United Kingdom . |
| 2055951 | 3/1981 | United Kingdom . |
| 2073808 | 10/1981 | United Kingdom . |
| 2075111 | 11/1981 | United Kingdom . |
| 2107500 | 4/1983 | United Kingdom . |
| 2110861 | 6/1983 | United Kingdom . |
| 2172928 | 10/1986 | United Kingdom . |

*Primary Examiner*—Renee S. Luebke
*Attorney, Agent, or Firm*—Sanford J. Asman

[57] ABSTRACT

An electronic token for use with a prepayment commodity meter such as an electricity meter comprises a key-like device 10 having a head 12 containing an electronic circuit and a body portion 14 for insertion into a keyway in a receptable 40 in the meter. The body portion 14 has grooves 24 which serve to guide the body portion into the keyway, and which contain electrical contacts 28, 30 connected within the device 10 to the electronic circuit. Between the body portion 14 and the head 12, the device 10 is provided with a locating recess 27, which engages a projection 78 in the receptacle 40 when the body portion is fully inserted into the keyway. The receptacle 40 incorporates a combined shutter 98 and spring 102, which serve to close the keyway in the absence of the device 10, and to urge the body portion 12 to one side of the keyway during insertion, such that the recess 27 engages the projection 78 and the contacts 28, 30 engage contacts 68, 72 in the receptacle.

19 Claims, 3 Drawing Sheets

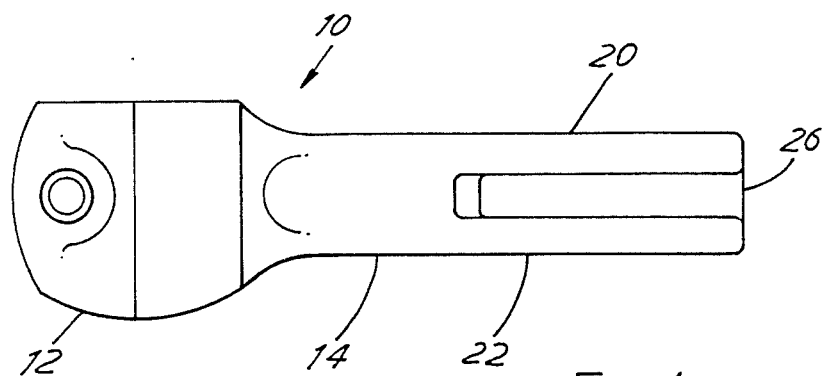
FIG.1
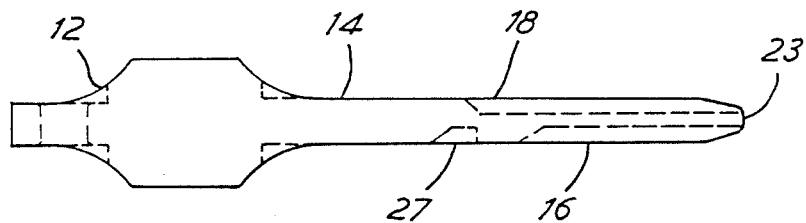
FIG.2
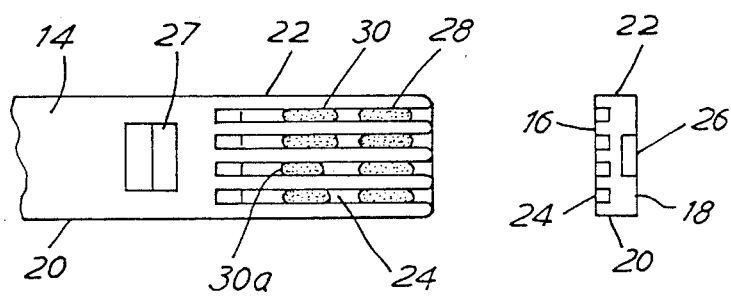 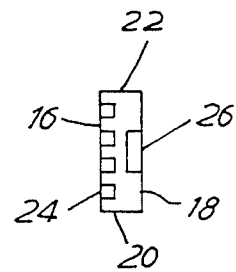
FIG.3   FIG.4

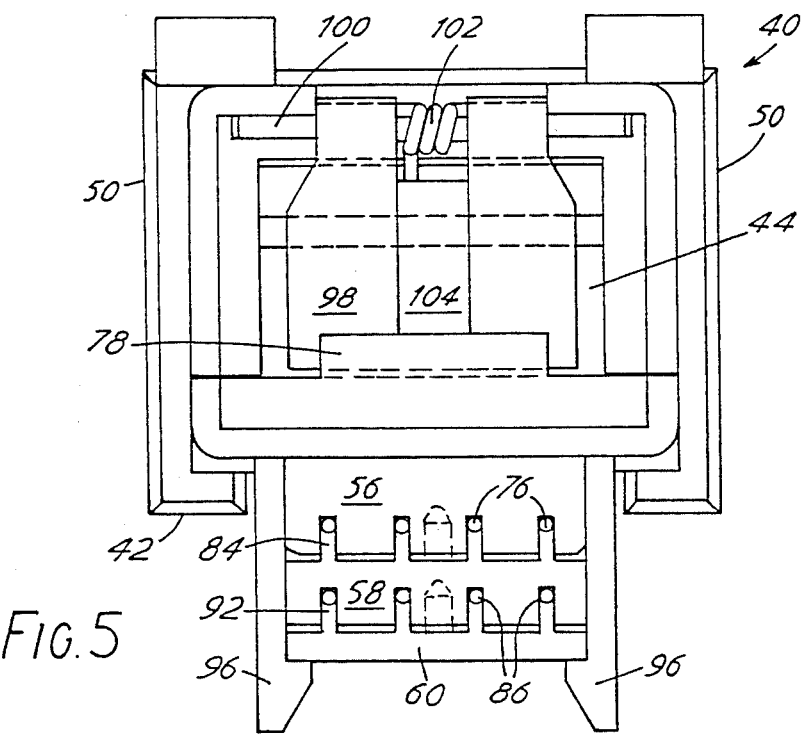
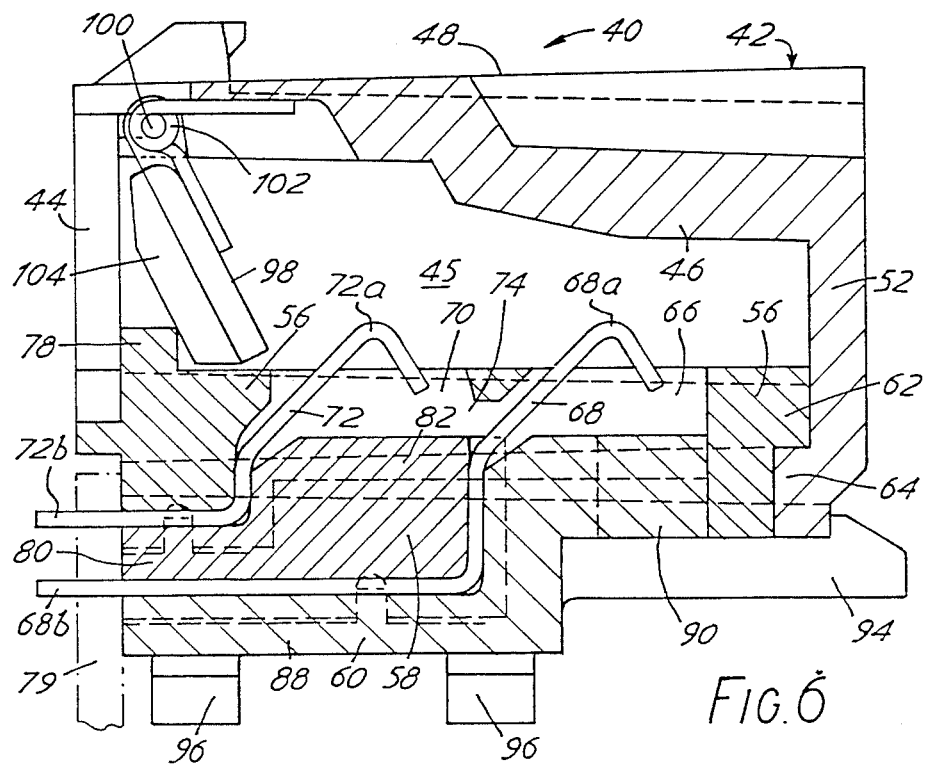

ELECTRONIC KEY AND RECEPTACLE THEREFOR

BACKGROUND OF THE INVENTION

This invention relates to electronic devices, and is more particularly concerned with an electronic key-like device containing an electronic circuit, and a receptacle for receiving the device and establishing electrical contact with the electronic circuit. The invention also concerns commodity metering systems, particularly electricity metering systems, employing such devices and receptacles.

In our United Kingdom patent application No. 8401932 (Publication No. 2153573A), there is described and claimed a prepayment electricity metering system in which an electronic key containing a memory co-operates with a receptacle in an electricity meter to control the supply of electricity to a consumer. Prior art electronic keys suitable for use in such a context are typically designed to be used in a manner similar to that in which a conventional mechanical key is used, i.e., they are designed to be inserted into the receptacle, and then turned (or rotated) in the receptacle to establish the required electrical contact. Although this has the merit of being familiar to, and therefore readily understandable by, consumers using electronic keys for the first time, it has the disadvantage that the key and receptacle are mechanically more complex, and therefore more expensive to make, than is strictly necessary.

It is one object of the present invention to provide an electronic key-like device and receptacle which are relatively simple and inexpensive to manufacture on a mass production basis, while still easy to use.

It is a further object of the present invention to provide a commodity metering system based on such an electronic key-like device and receptacle and having enhanced facilities.

SUMMARY OF THE INVENTION

According to one aspect of the present invention, there is provided the combination of an electronic key-like device containing an electronic circuit, with a receptacle for receiving the device and establishing electrical contact with the electronic circuit, wherein:

the device comprises a head portion, and a body portion adapted to be inserted into the receptacle, the body portion comprising guide means extending parallel to the direction of insertion of the body portion and a plurality of electrical contacts which are electrically connected to respective circuit points in the electronic circuit;

the receptacle includes a keyway shaped to receive the body portion of the device, means arranged to co-operate with the guide means on the body portion to guide the body portion into the keyway during insertion, and a plurality of electrical contacts each positioned to contact a respective one of the device contacts when the body portion is fully inserted into the keyway;

the receptacle and the body portion are provided with respective co-operating locating means which engage with each other when the body portion is fully inserted into the keyway, one of said locating means comprising a recess and the other comprising a projection which fits into the recess, and the locating means on the body portion being positioned between the head portion and the remainder of the body portion of the device; and the receptacle further includes biassing means arranged to bias said body portion towards one side of the keyway on insertion, the receptacle locating means being disposed on said one side of the keyway.

In a preferred embodiment of the invention, the recess is provided in the body portion of the device, and the projection is provided in the receptacle. In this case, the body portion of the device is preferably elongate in the direction of insertion, with a first pair of oppositely disposed side surfaces interconnected by a second pair of oppositely disposed side surfaces whose width, perpendicular to the direction of insertion, is significantly less than that of the first pair, and the recess is preferably disposed in one side surface of the first pair.

Advantageously, the recess is an elongate recess which extends perpendicular to the direction of insertion. However, the length of the recess is preferably less than the width of said one side surface, and the recess preferably does not reach either edge of said one side surface.

Conveniently, the guide means on the body portion includes at least one groove in each side surface of the first pair, the grooves being respectively disposed such that the body portion can be inserted into the receptacle in one orientation only. This can be achieved, for example, by providing a plurality of parallel grooves in said one side surface, and one groove in the opposite side surface. In this case, each of said plurality of grooves in said one side surface preferably contains at least one of said device contacts. Preferably, one of the device contacts is arranged to make contact with its respective receptacle contact, during insertion of the device, only after all the other device contacts have made contact with their respective device contacts.

Alternatively, the guide means may comprise at least one groove in each side surface of the first pair, the grooves being respectively disposed such that the body portion can be inserted into the receptacle in either of two orientations which differ from each other by 180° of rotation of the body portion about its longitudinal axis (i.e. the axis extending in the direction of insertion), and each side surface of the first pair may be provided with a respective one of said recesses, each recess being positioned to co-operate with the projection in the receptacle in a respective one of said orientations. In this case, it is preferably arranged that the grooves in one of said side surfaces contains a first set of said device contacts, the receptacle contacts each being positioned to contact a respective device contact of the first set when the body portion is inserted into the receptacle in one of said orientations, and the groove or grooves in the other of said side surfaces contains a second set of said device contacts, each device contact of the second set being connected to a respective one of the device contacts of the first set and being positioned such that when the body portion is inserted into the receptacle in the other orientation, each receptacle contact contacts the device contact of the second set connected to the device contact of the first set contacted by that receptacle contact when the body portion is inserted into the receptacle in said one orientation. Preferably, one device contact of the first set and the device contact of the second set connected to said one device contact of the first set are both arranged to make contact with their respective receptacle contact, during insertion of the device, only after all the other device contacts of the respective set have made contact with their respective receptacle contacts.

In one embodiment of the invention, the biasing means comprises spring-biased closure means arranged to close the entrance to the keyway in the absence of the body portion.

BRIEF DESCRIPTION OF THE DRAWING

The invention will now be described, by way of example only, with reference to the accompanying drawings, of which:

FIG. 1 is a plan view of one embodiment of an electronic key-like device in accordance with the present invention:

FIG. 2 is a view of part of the underside of the key of FIG. 1;

FIGS. 3 and 4 are sectional views of the device of FIG. 1;

FIG. 5 is a front view of a receptacle for receiving the device of FIGS. 1 to 4;

FIG. 6 is a sectional view of the receptacle of FIG. 5.

DETAILED DESCRIPTION OF AN EXEMPLARY EMBODIMENT

Figure 7:
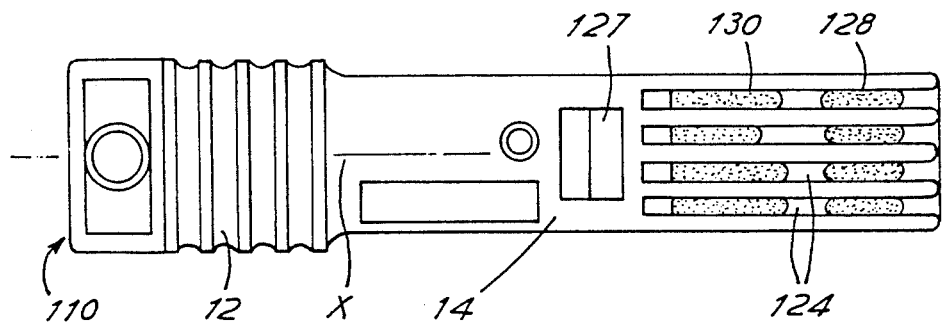
FIG. 7 is a plan view of an alternative embodiment of the key-like device of FIG. 1, also in accordance with the present invention.

The key-like device of FIGS. 1 to 4 is indicated generally at 10, and comprises a head portion 12 by which the device is held by its user, and body portion 14 shaped to be inserted into a corresponding receptacle of the kind which will be described hereinafter with reference to FIGS. 5 and 6. The head portion 12 and body portion 14 are integrally moulded in one piece from a suitable plastics material, for example an anti-static thermoplastics material such as that available under the trade name STATCON.

Encapsulated within the head portion 12 is a small printed circuit board (not shown), on which is mounted at least one integrated circuit, typically a 256 bit or 1 kilobit $E^2$PROM. Also mounted on the printed circuit board are several miniature surface-mounted components, typically a diode, a capacitor and about six resistors, to protect the integrated circuit from damage by electrostatic discharge. To further protect the integrated circuit from such electrostatic discharge, the plastics material from which the device 10 is moulded is loaded with carbon.

The body portion 14 is elongated in the direction of insertion, and substantially rectangular in cross-section, with a first pair of oppositely-disposed parallel side surfaces 16, 18 interconnected by a second pair of oppositely-disposed parallel side surfaces 20,22. The width of the side surfaces 16, 18 perpendicular to the direction of insertion of the device 10 is typically about 1.3 cm, whereas the width of the side surfaces 20,22 perpendicular to the direction of insertion is significantly less, typically just under 0.5 cm.

The free end 23 of the body portion 14 (i.e., the end remote from the head portion 12) is tapered, to facilitate insertion into the aforementioned receptacle.

The side surface 16 is provided with four grooves 24, which extend parallel to the direction of insertion of the device 10, and are uniformly spaced apart and symmetrically disposed across the width of the side surface 16. The side surface 18 has a single groove 26, which is parallel to the grooves 24, and disposed along the centre line of the side surface 18. All the grooves 24, 26 run out into the tapered end 23 of the body portion 14, and the groove 26 is longer (i.e., extends closer to the head portion 12) than the grooves 24. The side surface 16 is also provided, between the head portion 12 and the grooves 24, with a transversely extending recess or groove 27, which is symmetrically disposed between the opposite edges of the side surface 16 and does not reach these edges.

The grooves 24 each contain in their respective bases two longitudinally spaced electrical contacts 28 and 30, as can best be seen in FIG. 3: the contacts 28 are the ones nearer the tapered end 23 of the body portion 14, while the contacts 30 are the ones nearer the head portion 12. As can also be seen in FIG. 3, the four contacts 28 are aligned with each other perpendicular to the direction of insertion, as are the four contacts 30. However, one of the contacts 30, indicated at 30a, is shorter than all the other contacts 28 and 30, typically being only half their length. The trailing edge of the contact 30a, i.e., the edge which enters the aforementioned receptacle last during insertion, is aligned with the respective trailing edges of the other contacts 30, so that the leading edge of the contact 30a is typically aligned with about the middle of the length of the other contacts 30.

The contact 30a is electrically connected within the device 10 to the contact 28 in the same groove 24, while the other contacts 28 and 30 are electrically connected within the device 10 to respective circuit points on the aforementioned encapsulated printed circuit board: the precise details of these connections, and of the circuitry on the printed circuit board, are not relevant to the present invention, and so will be omitted for the sake of simplicity.

The receptacle of FIGS. 5 and 6 is indicated generally at 40, and comprises a generally box-like housing 42 having an opening 44 at one end. The width of the opening 44 is substantially equal to the width of the side surfaces 16,18 of the body portion 14 of the device 10 of FIGS. 1 to 3. The opening 44 communicates with the interior of the housing 42, this interior forming a keyway 45 shaped to receive the body portion 14 of the device 10.

The housing 42 is moulded in a suitable plastics material, and comprises a main housing member 46 defining the top 48, the side walls 50 and the rear 52 of the housing. The base of the housing 42 is made up of three interlocking base members 56, 58, 60, moulded in the same plastics material as the rest of the housing 42.

The first base member 56 extends the whole length of the housing 42, and its rear end (i.e. the end nearer the rear wall 52 of the housing) has a rearward projection 62 which rests on a ledge 64 projecting forwardly from the rear wall 52 of the housing. The base member 56 also has a first set of four contact slots 66, aligned with each other across the width of the keyway 45, through which respective electrical contacts 68, also aligned with each other across the width of the keyway, project into the keyway, and a second set of four similarly aligned contact slots 70 through which four more similarly aligned electrical contacts 72 project into the keyway: the contacts 68 are nearer the rear wall 52 of the housing 42, while the contacts 72 are nearer the opening 44. The slots 66,70 and contacts 68,72 are positioned such that the contacts 68 are aligned with and thus contact the contacts 28 on the body portion 14 of the device 10 when the body portion is fully inserted into the keyway 45, while the contacts 72 are aligned with and contact the contacts 30, as will hereinafter become apparent.

The upper side of the base member 56 is provided with a deep centrally-disposed recess 74 into which the slots 66 and 70 open, while the underside of the portion of the base member 56 between this recess and the front end of the base member is provided with four deep parallel grooves 76. The upper surface is provided, closely adjacent its front end, with an upward projection 78 which extends across the central part of the width of the opening 44 in the housing 42.

The contacts 68 and 72 are each made from a short length of resilient wire, one end of which is bent to form an inverted V-shaped portion 68a or 72a which projects through the respective slot 66 or 70 into the keyway 45 and constitutes the contact proper. The other ends 72b of the wires forming the contacts 72 pass through respective ones of the grooves 76 in the underside of the first base member 56, and are soldered into a printed circuit board 79.

The second base member 58 has a forward portion 80 which seats against the underside of the front end of the first base member 56, and a rearward portion 82 which seats in the forward half of the recess 74. The upper surface of the forward portion 80 is provided with locating spigots 84, which project into respective ones of the grooves 76, and hold the ends 72b of the contacts 72 in these grooves. The undersurface of the base member 58 has four parallel grooves 86, which receives respective ones of the other ends 68b of the wires forming the contacts 68: these wire ends 68b are also soldered into the printed circuit board 79.

The third base member 60 has a forward portion 88 which seats against the underside of the second base member 58, and a rearward portion 90 which seats in the rearward half of the recess 74. The upper surface of the forward portion 88 is provided with locating spigots 92, which project into respective ones of the grooves 86, and hold the ends 68b of the contacts 68 in the grooves. The underside of the rearward portion 90 of the base member 60 is provided with two rearwardly extending, integrally formed, resilient catch members 94, which underlie and support the rear end of the base member 56, and pass under the rear wall 52 of the housing 42 to engage its outside surface. All three base members 56, 58, 60 are clamped together by two pairs of resilient catch members 96, which extend downwardly from and are integral with the side walls 50 of the housing 42.

The opening 44 is closed by a flap 98, which is pivotally mounted on a pin 100 extending transversely across the top of the opening between the side walls 50 of the housing. The flap 98 is biassed towards the closed position, in which its lower edge abuts the rear edge of the projection 78 at the front end of the base member 56, by a spring 102. Additionally, the flap 98 is provided with a rectangular-section projection 104 which extends from near its top edge to its bottom edge, down its centre line. The cross-section of the projection 104 is shaped to correspond with that of the groove 26 in the side face 18 of the body portion 14 of the device 10.

In use, the receptacle 40 is typically incorporated within the housing of an electricity metering system of the kind described in our aforementioned application Ser. No. 8401932, with the opening 44 readily accessible from the front of the housing, but with the printed circuit board 79 disposed inside the housing. The printed circuit board 79 has mounted thereon all or part of circuitry similar to that described in our aforementioned application, and to gain access to electricity, a consumer merely inserts the device 10, with its encapsulated circuitry appropriately loaded with data as described in the aforementioned application, into the receptacle 40.

To achieve this, the body portion 14 of the device 10 is inserted through the opening 44 in the receptacle 40 with its side surface 18 uppermost, over the top of the projection 78. The tapered free end 23 of the body portion 14 facilitates insertion, and lifts the flap 98 against the action of the spring 102. Since, as already mentioned, the width of the opening 44 is substantially equal to the width of the side surfaces 16,18 of the body portion 14, the body portion tends to centre itself in the width of the keyway 45. As a result, the projection 104 engages in the groove 26 in the upper side face 18, and guides the body portion 14 into the keyway 45 such that each pair of corresponding receptacle contacts 68 and 72 enters a respective one of the grooves 24 in the lower side surface 16 of the body portion 14. The flap 98 and spring 102 act to bias the body portion 14 downwardly, so that when the body portion is fully inserted into the keyway 45, the whole body portion is pushed down to cause the projection 78 to enter the recess 27, thus locking the device 10 in the receptacle 40 and establishing good electrical contact between the device contacts 28,30 and the receptacle contacts 68,72.

It will be appreciated that because of the shortening of the device contact 30a in relation to all of the other device contacts 28 and 30, all the other device contacts 28 and 30 tend to make contact with their respective receptacle contacts 68 and 72 during insertion before the device contact 30a makes contact with its receptacle contact 72. The position of the device contact 30a in relation to the recess 27 is such that the device contact 30a makes contact with its receptacle contact 72 when the recess 27 drops down over the projection 78.

The contact 68 of the pair of receptacle contacts 68,72 which enter the groove 24 containing the shorted-together device contacts 28 and 30a is repeatedly interrogated, eg by pulsing it, by the circuitry within the metering system. The other contact 72 of this pair is simultaneously checked, on the occurrence of each pulse, to see if the pulse appears at this other contact via the shorted-together contacts 28 and 30a of the device 10. When the pulse does so appear, it thus is an indication that the body portion 14 of the device 10 is indeed fully inserted into the receptacle, and only then are the appropriate ones of the other receptacle contacts 68 and 72 energised to establish communication between the circuitry of the metering system and the circuitry encapsulated within the device 10.

To remove the device 10 from the receptacle 40 of the metering system, it is merely necessary to lift the head portion 12 a little, thus raising the body portion 14 within the keyway 45 against the action of the spring-biassed flap 98 and disengaging the recess 27 from the projection 79. The body portion 14 of the device 10 can then simply be withdrawn from the keyway 45.

It will be appreciated that the device 10 and receptacle 40 are relatively simple to make and to use. This is largely due to the fact that the device 10 does not need to be rotated within the receptacle 40, but can simply be pushed straight in and pulled straight out. However, the integrity of the electrical connection between the device contacts 28,30 and the receptacle contacts 68,72 is assured firstly by the positive location provided by the engagement of the recess 27 and the projection 78 upon full insertion of the body portion 14 into the keyway 45, and secondly by the ability to test electrically that full insertion has occurred via the shorted-together contacts 28 and 30a.

Figure 8:
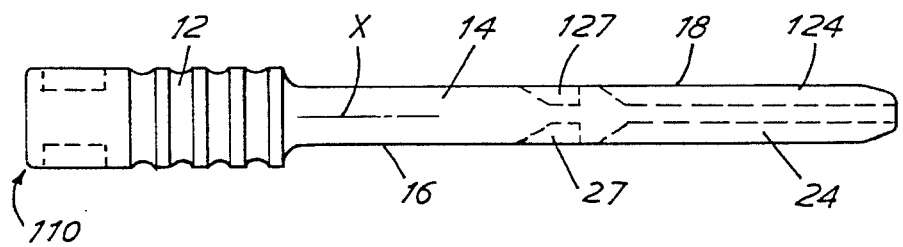
FIGS. 8 and 9 are side and end views, respectively, of the device of FIG. 7.
Figure 9:
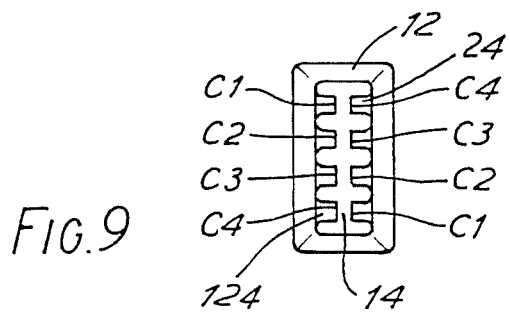

The key-like device of FIGS. 7 to 9 has several features in common with the device 10 of FIGS. 1 to 4. These common features have therefore been given the same reference numerals as were used in FIGS. 1 to 5, and only the points of difference will be described in detail.

The device of FIGS. 7 to 9 is indicated generally at 110, and comprises a head portion 12 and a body portion 14 of the same general kind as those of the device 10 of FIGS. 1 to 4: in particular, the body portion 14 has a side surface 16 containing four grooves 24 substantially identical to those of the device 10, and containing electrical contacts 28 and 30 substantially identical to those of the device 10. However, the side surface 18 of the body portion 14, instead of containing a single centrally disposed groove corresponding to the groove 26 of the device 10, contains four more grooves 124 substantially identical in form and distribution to the grooves 24, and containing contacts 128 and 130 dimensioned and distributed substantially identically to the contacts 28 and 30.

Each of the contacts 128 and 130 is connected within the device 110 to the respective one of the contacts 28, 30 which occupies the position which the electrode 128 or 130 would occupy if the device 110 were rotated through 180° about the longitudinal axis of the device, indicated at X in FIGS. 7 to 9: this is best illustrated in FIG. 9, where four pairs of connected-together contacts are given the references C1 to C4.

Additionally, as well as having the tranversely extending recess 27 in its side surface 16, the device 110 has an identical recess 127 in its side surface 18, in a position exactly corresponding to that of the recess 27.

The result of these differences is that the device 110 can be inserted into the receptacle 40 in either of two orientations separated by 180° of rotation about its longitudinal axis X, i.e. with either its side surface 16 or its side surface 18 facing upwardly. In other words, from the viewpoint of the receptacle 40, the device 10 looks mechanically and electrically identical in these two orientations. The only modification required to be made to the receptacle 40 is the replacement of the single projections 104 on the flap 98 with four parallel projections (not shown) shaped and positioned to engage in the grooves 24 or 124 as the device 110 is inserted into the receptacle.

We claim:

1. In combination, an electronic key-like device containing an electronic circuit, and a receptacle for receiving the device and establishing electrical contact with the electronic circuit, wherein:

the device comprises a head portion, and a body portion adapted to be inserted into the receptacle in a given direction, the body portion comprises guide means extending parallel to the direction of insertion of the body portion and a plurality of electrical contacts which are electrically connected to respective circuit points in the electronic circuit, the body portion being elongate in the direction of insertion, and the body portion having a first pair of oppositely disposed side surfaces interconnected by a second pair of oppositely disposed side surfaces whose width, perpendicular to the direction of insertion, is significantly less than that of the first pair, and said body portion having a recess disposed on one side surface of the first pair;

the receptacle includes a keyway shaped to receive the body portion of the device means arranged to co-operate with the guide means on the body portion to guide the body portion into the keyway during insertion, and a plurality of electrical contacts each positioned to contact a respective one of the device contacts when the body portion is fully inserted into the keyway;

the receptacle and the body portion are provided with respective cooperating locating means which engage with each other when the body portion is fully inserted into the keyway, said locating means on said body portion comprising said recess and said locating means on said receptacle comprising a projection which fits into said recess, and the receptacle further includes biasing means arranged to bias said body portion towards one side of the keyway on insertion, the receptacle locating means being disposed on said one side of the keyway.

2. The combination of claim 1, wherein the body portion of the device is substantially rectangular cross-section.

3. The combination of claim 1, wherein said recess is an elongate recess which extends perpendicular to the direction of insertion.

4. The combination of claim 3, wherein the recess has a length which is less than the width of said one side surface, and the recess does not reach either edge of said one side surface.

5. The combination of claim 1, wherein the guide means on the body portion includes at least one groove in one side surface of the first pair.

6. The combination of claim 5, wherein the guide means on the body portion includes at least one groove in each side surface of the first pair, the grooves being respectively disposed such that the body portion can be inserted into the receptacle in one orientation only.

7. The combination of claim 6, wherein the guide means on the body portion includes a plurality of parallel grooves in said one side surface, and one groove in the opposite side surface.

8. The combination of claim 7, wherein each of said plurality of grooves in said one side surface contains at least one of said device contacts.

9. The combination of claim 5, wherein the guide means comprises at least one groove in each side surface of the first pair, the grooves being respectively disposed such that the body portion can be inserted into the receptacle in either of two orientations which differ from each other by 180° of rotation of the body portion about its longitudinal axis, and each side surface of the first pair is provided with a respective one of said recesses, each recess being positioned to co-operate with the projection in the receptacle in a respective one of said orientations.

10. The combination of claim 9, wherein the groove or grooves in one of said side surfaces contains a first set of said device contacts, the receptacle contacts each being positioned to contact a respective device contact of the first set when the body portion is inserted into the receptacle in one of said orientations, and the groove or grooves in the other of said side surfaces contains a second set of said device contacts, each device contact of the second set being connected to a respective one of the device contact of the first set and being positioned such that when the body portion is inserted into the receptacle in the other orientation, each receptacle contact contacts the device contact of the second set connected to the device contact of the first set contacted by that receptacle contact when the body portion is inserted into the receptacle in said one orientation.

11. The combination of claim 10, wherein one device contact of the first set and the device contact of the second set connected to said one device contact of the first set are both arranged to make contact with their respective receptacle contact, during insertion of the device, only after all the other device contacts of the respective set have made contact with their respective receptacle contacts.

12. The combination of claim 11, wherein said device contacts each have one end which first makes contact with a respective receptacle contact during insertion, said one end of said one device contact of the first set and said one end of said one device contact of the second set connected to said one device contact of the first set both being closer to the head portion of the device than are said one ends of the other device contacts.

13. The combination of claim 11, wherein said one device contact of the first set is directly connected to another device contact of the first set.

14. The combination of claim 1, wherein one of the device contacts is arranged to make contact with its respective receptacle contact, during insertion of the device, only after all the other device contacts have made contact with their respective device contacts.

15. The combination of claim 14, wherein said device contacts each have one end which first makes contact with a respective receptacle contact during insertion, said one end of said one device contact being closer to the head portion of the device than are said one ends of the other device contacts.

16. The combination of claim 14, wherein said one device contact is directly connected to another of said device contacts.

17. The combination of claim 1, wherein the biasing means comprises spring-biased closure means arranged to close the keyway in the absence of the body portion.

18. The combination of claim 1, wherein the receptacle contacts are resilient, and project into the keyway from said one side thereof to make resilient sliding contact with the device contacts.

19. The combination of claim 18, wherein each receptacle contact comprises a wire which projects into the keyway from said one side thereof, is inclined along the keyway generally in the direction of insertion of the device, and has its projecting end bent over to extend back towards said one side of the keyway.

* * * * *